L. L. KNOX & E. B. TYLER.
HEAT DISTRIBUTING SYSTEM.
APPLICATION FILED OCT. 18, 1910.
1,005,717.
Patented Oct. 10, 1911.
2 SHEETS—SHEET 1.
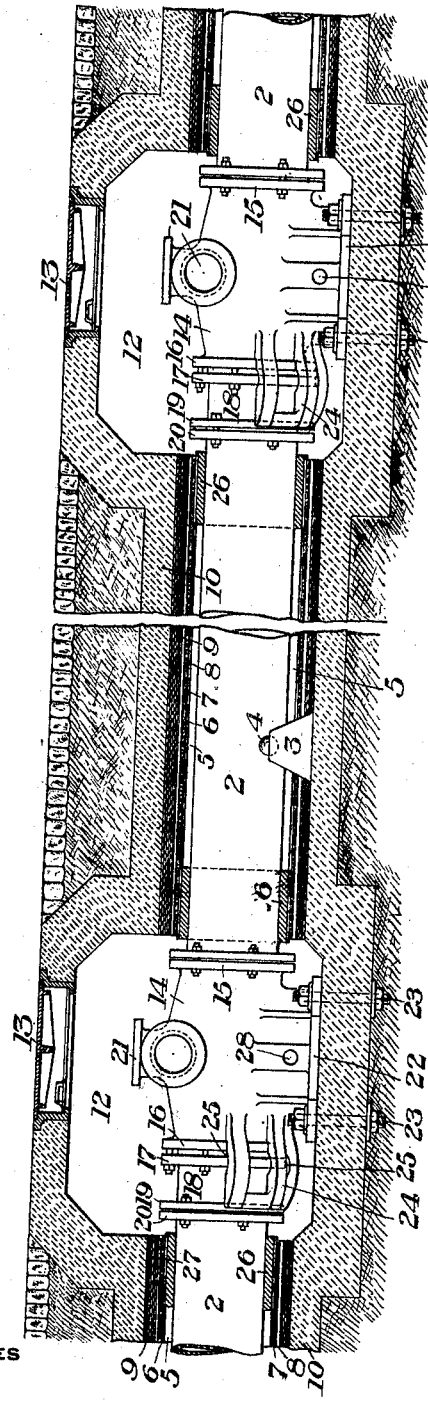
WITNESSES
INVENTORS L. L. KNOX & E. B. TYLER.
HEAT DISTRIBUTING SYSTEM.
APPLICATION FILED OCT. 18, 1910.
1,005,717.
Patented Oct. 10, 1911.
2 SHEETS—SHEET 2.
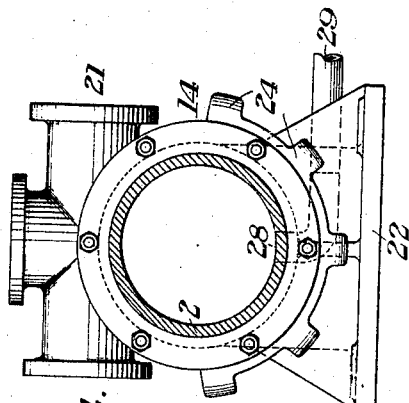
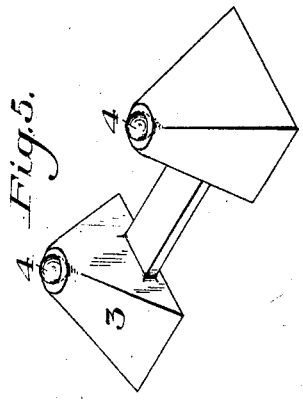
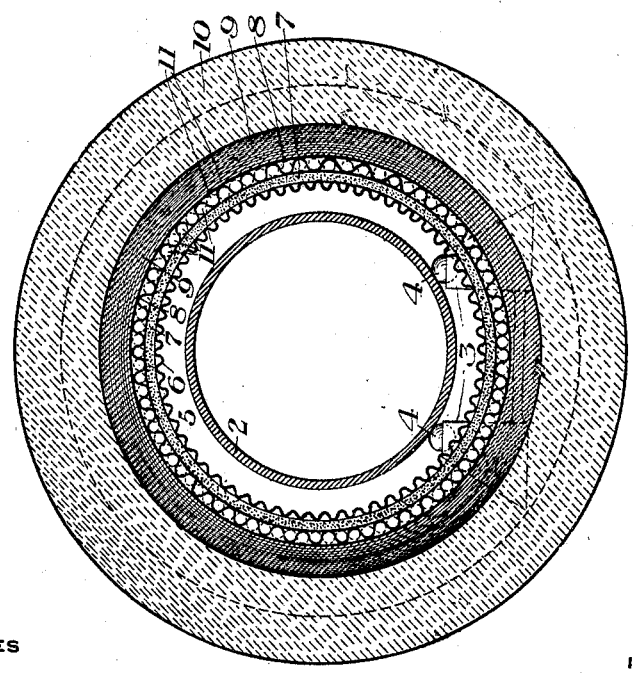
WITNESSES
R. A. Balderson
W. Famariss
INVENTORS
L. L. Knox
E. B. Tyler
by Bakewell, Byrnes & Parmelee
their Attys.

UNITED STATES PATENT OFFICE.

LUTHER L. KNOX, OF AVALON, AND EDWARD B. TYLER, OF WILKINSBURG, PENNSYLVANIA; SAID KNOX ASSIGNOR TO SAID TYLER, OF PITTSBURGH, PENNSYLVANIA.

HEAT-DISTRIBUTING SYSTEM.

1,005,717.     Specification of Letters Patent.     Patented Oct. 10, 1911.

Application filed October 18, 1910. Serial No. 587,774.

*To all whom it may concern:*

Be it known that we, LUTHER L. KNOX, a resident of Avalon, and EDWARD B. TYLER, a resident of Wilkinsburg, in the county of Allegheny and State of Pennsylvania, have invented a new and useful Improvement in Heat-Distributing Systems, of which the following is a full, clear, and exact description, reference being had to the accompanying drawings, forming part of this specification, in which—

Figure 1 is a longitudinal section of a portion of a conduit embodying our invention; Fig. 2 is a perspective view of one of the insulators; Fig. 3 is a cross section of the conduit; Fig. 4 is a cross section of one of the connecting members; and Fig. 5 is a detail view of one of the pipe supports. Fig. 6 is a longitudinal sectional detail view showing one of the expansion joints.

Our invention has relation to heat-distributing systems and more particularly to the construction of the conduits employed, the objects of our invention being first, to improve the construction of the conduit whereby it is rendered more durable and of better heat-insulating quality; second, to provide improved expansion connections for the conduit sections; and third, to improve other detail features of the construction.

In the accompanying drawings, the numeral 2 designates the heat-conveying pipe, which is supported at intervals out of contact with a surrounding casing by means of suitable supporting stands 3, preferably having antifriction balls 4, upon which the pipe rests. Surrounding this pipe and separated therefrom by a dead air space 5 is a casing consisting of an inner metallic layer 6, a surrounding layer 7 of asbestos or other suitable heat-insulating material, another layer or layers 8, preferably of corrugated asbestos board, a plurality of surrounding layers 9 of wool felt or similar material, and an outer covering 10 of reinforced concrete. The inner metallic layer 6 is preferably of corrugated copper, the corrugations giving the metal additional strength, copper being especially suitable for the purpose on account of the fact that it is not corroded by contact with asbestos. The asbestos board 8 preferably has its convolutions supported against crushing in building up the conduit by placing reeds or sticks 11 in said convolutions, as indicated in Fig. 3, and may be treated with waterproof or fireproof material, or both. The layers of wool felt may be waterproofed on their outer surface, and the outer concrete casing 10 may also be waterproofed. The corrugated asbestos board 8 forms a second dead air space or chamber surrounding the dead air space or chamber 5, and its employment in the conduit greatly increases the heat-insulating capacity of the casing.

12 in Fig. 1 indicates suitable junction boxes, provided with man-holes and covers 13, by means of which access may be had to the boxes. The ends of the pipe sections 2 extend into these junction boxes and are connected therein by means of castings 14. Each of the castings is provided at one end with a bolting flange 15, to which the flanged end of the adjacent pipe is securely bolted. Each of the castings is formed at the opposite end with a flange 16, having secured thereto a gland ring 17, through which a relatively short expansion section 18 extends loosely into the interior of the casting, so as to be free to move when expanding and contracting. The outer end of this expansion section is formed with a flange 19, to which is bolted a flange 20, on the adjacent pipe section 2. Each casting 14 is provided with one or more connections 21, from which service pipes may be led. It is also provided with a suitable foot 22, which is securely anchored to the foundation, as by the bolts 23. One end of the casting is also provided with the extension 24, which forms a cradle-like support for the expansion section 18, being provided with suitable grooves or seats 25, for the rings or flanges 16, 17 and 19.

Where each pipe section 2 passes into the junction box, it is provided preferably with a surrounding sleeve member 26 of corrugated or other suitable insulating material. These not only insulate the pipe sections against electric currents which cause electrolysis, but they also close the ends of the dead air spaces or chambers 5, and further act as supports for the pipe where they enter the junction boxes. These sleeve members are preferably exteriorly corrugated, as shown at 27, so as to fit the corrugations of the sheet metal lining 6. The castings 14 may be provided with drain openings 28 at the bottom, to which drain pipes 29 may be connected, as shown in Fig. 4, for the purpose of carrying off the water of condensation.

Suitable holes are formed in the conduit to receive the supporting stands 3. These holes are formed before the concrete is applied and after the portion of the conduit within the concrete has been manufactured.

Our invention provides a conduit having an efficient heat insulation and which can be constructed and installed at a comparatively low cost. It also provides simple and efficient expansion connections for the pipe and protects the latter against corrosion.

It will be obvious that various changes may be made in the details of construction and arrangement of the several parts, without departing from the spirit and scope of our invention, as defined in the appended claims. Thus, certain elements of the conduit casing may be retained while the other elements may be varied and changes made in the details of the castings 14; the pipe sections 2, may be supported within the conduit in other ways, and various other changes may be made.

We claim:

1. A heat-conveying conduit, comprising an inner pipe, a surrounding dead air space, and an outer casing or covering having an inner layer of corrugated copper and a surrounding layer of corrugated asbestos board, substantially as described.

2. A heat-conveying conduit, comprising an inner pipe, a surrounding dead air space, and an outer casing or covering having an inner layer of corrugated copper and a surrounding layer of corrugated asbestos board, together with means for initially supporting the asbestos board against crushing, substantially as described.

3. A heat-conveying conduit, comprising an inner pipe having a surrounding dead air space, a casing or covering therefor comprising an inner layer of corrugated metal, a surrounding layer of heat-insulating material forming a second dead air space, and a fibrous body surrounding the second dead air space, substantially as described.

4. A heat-conveying conduit, comprising an inner pipe having a surrounding dead air space, a casing or covering therefor comprising an inner layer of corrugated metal, a surrounding layer of heat-insulating material forming a second dead air space, and a fibrous body surrounding the second dead air space, together with an outer covering of concrete substantially as described.

5. In a heat-distributing system, a conveyer pipe having a surrounding dead air space, a casing or covering around the dead air space, the casing or covering having an inner layer of corrugated metal, junction or connection boxes, and insulating sleeves closing the ends of the dead air spaces where the pipe enters the box, said sleeves having exterior corrugations adapted to the corrugations of the inner casing layer, substantially as described.

6. A heat-conveying conduit, comprising an inner pipe having a surrounding dead air space, a casing or covering therefor comprising an inner layer of metal, a surrounding layer of heat-insulating material forming a second dead air space, and a fibrous body surrounding the second dead air space, together with an outer covering of concrete, substantially as described.

7. A heat-conveying conduit, comprising an inner pipe, a surrounding dead air space, and an outer casing or covering having an inner layer of metal and a surrounding layer of asbestos containing dead air spaces, said metal layer being of a material, such as copper, which is not corroded by contact with asbestos, and a fibrous body surrounding the asbestos, substantially as described.

8. In a heat-distributing system, a conveyer pipe formed in sections and having a surrounding casing or conduit formed with junction or connection boxes into which the ends of the pipe sections extend, a rigid casting in each junction box having a passage therethrough, one end of one pipe section being rigidly connected to said casting and the other pipe section having an expansion connection with the casting, said casting having an extension forming a support for the expansion connection, substantially as described.

In testimony whereof, we have hereunto set our hands.

LUTHER L. KNOX.
EDWARD B. TYLER.

Witnesses:
GEO. H. PARMELEE,
H. M. CORWIN.

Copies of this patent may be obtained for five cents each, by addressing the "Commissioner of Patents, Washington, D. C."